(12) United States Patent
Shiao et al.

(10) Patent No.: US 7,452,598 B2
(45) Date of Patent: *Nov. 18, 2008

(54) MINERAL-SURFACED ROOFING SHINGLES WITH INCREASED SOLAR HEAT REFLECTANCE, AND PROCESS FOR PRODUCING SAME

(75) Inventors: Ming Liang Shiao, Collegeville, PA (US); Gregory F. Jacobs, Oreland, PA (US); Husnu M. Kalkanoglu, Swarthmore, PA (US); Keith C. Hong, Lititz, PA (US)

(73) Assignee: CertainTeed Corporation, Valley Forge, PA (US)

( * ) Notice: Subject to any disclaimer, the term of this patent is extended or adjusted under 35 U.S.C. 154(b) by 896 days.

This patent is subject to a terminal disclaimer.

(21) Appl. No.: 10/749,680

(22) Filed: Dec. 31, 2003

(65) Prior Publication Data

US 2005/0072110 A1 Apr. 7, 2005

Related U.S. Application Data

(63) Continuation-in-part of application No. 10/679,898, filed on Oct. 6, 2003, now Pat. No. 7,241,500.

(51) Int. Cl.
*B32B 5/66* (2006.01)
(52) U.S. Cl. .................. 428/402; 428/403; 428/404; 428/405; 428/406; 428/407; 252/587; 106/493
(58) Field of Classification Search ......... 428/402–407; 106/493; 252/587
See application file for complete search history.

(56) References Cited

U.S. PATENT DOCUMENTS

| | | | |
|---|---|---|---|
| 2,732,311 A | | 1/1956 | Hartwright |
| 2,963,378 A | | 12/1960 | Palmquist et al. |
| 2,981,636 A | * | 4/1961 | Lodge et al. .......... 428/404 |
| 3,255,031 A | | 6/1966 | Lodge et al. |
| 4,583,486 A | | 4/1986 | Miller |
| 4,717,614 A | | 1/1988 | Bondoc et al. |
| 4,916,014 A | | 4/1990 | Weber et al. |
| 5,194,113 A | | 3/1993 | Lasch et al. |
| 5,310,803 A | | 5/1994 | Hansen |
| 5,380,552 A | | 1/1995 | George et al. |
| 5,516,573 A | | 5/1996 | George et al. |
| 5,723,516 A | | 3/1998 | Bigham et al. |
| 5,731,369 A | | 3/1998 | Mahoney |
| 5,928,761 A | | 7/1999 | Hedblom et al. |
| 5,962,143 A | | 10/1999 | Krauthauser et al. |
| 6,174,360 B1 | | 1/2001 | Sliwinski et al. |
| 6,217,252 B1 | | 4/2001 | Tolliver et al. |
| 6,366,397 B1 | | 4/2002 | Genjima et al. |
| 6,376,075 B1 | | 4/2002 | Tacke-Willemsen et al. |
| 6,451,874 B1 | | 9/2002 | Purget et al. |
| 6,454,848 B2 | | 9/2002 | Sliwinski et al. |
| 6,521,038 B2 | * | 2/2003 | Yanagimoto et al. ........ 106/493 |
| 6,533,961 B2 | | 3/2003 | Harelstad et al. |
| 6,548,145 B2 | | 4/2003 | Joedicke |
| 6,569,520 B1 | | 5/2003 | Jacobs |
| 6,572,784 B1 | | 6/2003 | Coombs et al. |
| 6,596,070 B1 | | 7/2003 | Schmidt et al. |
| 6,599,355 B1 | | 7/2003 | Schmidt et al. |
| 6,607,781 B2 | | 8/2003 | Joedicke |
| 6,610,147 B2 | | 8/2003 | Aschenbeck |
| 6,692,824 B2 | | 2/2004 | Benz et al. |
| 2002/0092596 A1 | | 7/2002 | Phillips et al. |
| 2002/0160151 A1 | | 10/2002 | Pinault et al. |
| 2003/0035972 A1 | | 2/2003 | Hanson et al. |
| 2003/0044525 A1 | | 3/2003 | Aschenbeck |
| 2003/0068469 A1 | | 4/2003 | Aschenbeck et al. |
| 2003/0091795 A1 | | 5/2003 | Kiik et al. |
| 2003/0091814 A1 | | 5/2003 | Benz et al. |
| 2003/0152747 A1 | | 8/2003 | Fensel et al. |
| 2003/0203145 A1 | | 10/2003 | Zanchetta et al. |
| 2003/0219563 A1 | | 11/2003 | Zanchetta et al. |
| 2004/0009319 A1 | | 1/2004 | Zanchetta et al. |

OTHER PUBLICATIONS

Y. Jiang, et al., "Novel Pigment Approaches In Optically Variable Security Inks Including Polarizing Cholesteric Liquid Crystal (CLC) Polymers," *Optical Security and Counterfeit Deterrence Techniques IV*, SPIE 4677, 2002.
T. A. Germer, et al., "Modeling the appearance of special effect pigment coatings," *Surface Scattering and Diffraction for Advanced Metrology*, Proc. SPIE 4447, 77-86, 2001.
L. Sung, et al., "Characterization of Coating Microstructure Using Laser Scanning Confocal Microscopy," undated.

(Continued)

*Primary Examiner*—Leszek Kiliman
(74) *Attorney, Agent, or Firm*—Paul & Paul (57) ABSTRACT

An infrared-reflective material is applied directly to the bituminous surface of a roofing product to increase the solar heat reflectance of the product, even when deep-tone roofing granules are used to color the product. The infrared-reflective material can be applied as a powder or in a carrier fluid or film, and can be applied along with infrared-reflective roofing granules.

20 Claims, 2 Drawing Sheets

OTHER PUBLICATIONS

Adobe Systems Incorporated, Technical Guides "Color Models, The CIE Color Models," 2 pgs. 2000.

Adobe Systems Incorporated, Technical Guides "Color Models, The Munsell Color System," 4 pgs., 2000.

Adobe Systems Incorporated, Technical Guides "Color Models, CIELAB," 2 pgs., 2000.

Adobe Systems Incorporated, Technical Guides "Color Models, CIEXYZ," 2 pgs., 2000.

Project Advisory Committee Meeting, "Development of Cool Colored Roofing Materials," Oak Ridge National Laboratory and Livermore Berkeley National Laboratory, 55 pgs., Mar. 11, 2003.

Ferro Corporation, "How Cool Colors & Eclipse Work," 3 pgs., 1999-2003.

Ferro Corporation, "Cool Colors & Eclipse Heat and Energy Saving Pigments," 2 pgs., 1999-2003.

Gaco Western Inc., "Solar Reflectivity of Common Roofing Materials and GacoFlex Roof Coatings," 2 pgs., undated.

BASF Aktiengesellschaft, "Product Specification, SICOLUX Metal Gloss L 6015," 1 pg., Sep. 18, 2002.

BASF Aktiengesellschaft, "Product Specification, SICOLUX Copper Gloss L 3015," 1 pg., Sep. 18, 2002.

BASF Corporation, "BASF launches two new pigments for tile coatings," by BASF Corporation, 1 pg., 1998-2003.

Silberline Manufacturing Co., Inc., "StarBrite," 1 pg., 2003.

* cited by examiner

MINERAL-SURFACED ROOFING SHINGLES WITH INCREASED SOLAR HEAT REFLECTANCE, AND PROCESS FOR PRODUCING SAME

CROSS-REFERENCE TO RELATED APPLICATION

This is a continuation-in-part of U.S. patent application Ser. No. 10/679,898, filed Oct. 6, 2003, incorporated herein by reference, now U.S. Pat. No. 7,241,500.

BACKGROUND OF THE INVENTION

1. Field of the Invention

The present invention relates to bituminous roofing products such as asphalt shingles and processes for making such roofing products.

2. Brief Description of the Prior Art

Roofing products such as asphalt shingles are typically composite articles including a nonwoven glass fiber or felt web covered with a coating of water repellent bituminous material, and surfaced with protective mineral-based roofing granules.

The bituminous material is characteristically black in color, and is strongly absorptive of incident solar radiation.

Pigment-coated mineral rocks are commonly used as color granules in roofing applications to provide aesthetic as well as protective functions to the asphalt shingles. Roofing granules are generally used in asphalt shingle or in roofing membranes to protect asphalt from harmful ultraviolet radiation.

Mineral surfaced asphalt shingles, such as those described in ASTM D225 or D3462, are generally used in steep-sloped roofs to provide water-shedding function while adding aesthetically pleasing appearance to the roofs. The asphalt shingles are generally constructed from asphalt-saturated roofing felts and surfaced by pigmented color granules, e.g., as those described in U.S. Pat. No. 4,717,614. However, such asphalt shingles are known to have low solar reflectivity and hence will absorb solar heat especially through the near infrared range of the solar spectrum.

This phenomenon increases as the granules covering the surface become dark in color. For example, the white-colored asphalt shingles with CIE L*>60 can have solar reflectance greater than 25% (ASTM E1918 method), whereas the non-white asphalt shingles with L*<60 can only have solar reflectance in the range of 5-20%. As a result, it is common to measure temperatures as high as 160-170° F. (71-77 degrees Centigrade) on the surface of dark roofing shingles in a sunny day with 80° F. (27 degree Centigrade) ambient temperature.

Absorption of solar heat may result in elevated temperatures at the shingles' surroundings, which can contribute to the so-called "heat-island" effects and increase the energy load required to cool the surroundings.

In order to address this problem, externally applied coatings have sometimes been applied directly onto the shingle surface on the roof. White pigment-containing latex coatings have been proposed.

The use of exterior-grade coatings colored by infrared-reflective pigments for deep-tone colors has also been proposed for spraying onto the roof in the field. U.S. Patent Application Publication No. 2003/0068469A1 discloses an asphalt-based roofing material comprising mat saturated with asphalt coating and a top coating having a top surface layer that has a solar reflectance of at least 70%.

U.S. Patent Application Publication No. 2002/0160151A1 discloses an integrated granule product comprising a film having a plurality of ceramic-coated granules bonded to the film by a cured adhesive and the cured adhesive or the film can have pigments. Such integrated granule product can be directly bonded to an asphalt-based substrate as roofing products.

Roofing granules typically comprise crushed and screened mineral materials, which are subsequently coated with a binder containing one or more coloring pigments, such as suitable metal oxides. The binder can be a soluble alkaline silicate that is subsequently insolubilized by heat or by chemical reaction, such as by reaction between an acidic material and the alkaline silicate, resulting in an insoluble colored coating on the mineral particles. Preparation of colored, coated roofing granules is disclosed for example, in U.S. Pat. No. 2,981,636 of Lodge et al. The granules are then employed to provide a protective layer on asphaltic roofing materials such as shingles, and to add aesthetic values to a roof.

Pigments for roofing granules have usually been selected to provide shingles having an attractive appearance, with little thought to the thermal stresses encountered on shingled roofs. However, depending on location and climate, shingled roofs can experience very challenging environmental conditions, which tend to reduce the effective service life of such roofs. The elevated temperature experienced by roofing shingles under sunny, summer conditions is a significant environmental stress, especially for roofing shingles coated with dark colored roofing granules. Although such roofs can be coated with solar reflective paint or coating material, such as a composition containing a significant amount of titanium dioxide pigment, in order to reduce such thermal stresses, this utilitarian approach will often prove to be aesthetically undesirable, especially for residential roofs.

Asphalt shingles coated with conventional roofing granules are known to have low solar heat reflectance, and hence will absorb solar heat especially through the near infrared range (700 nm-2500 nm) of the solar spectrum. This phenomenon increases as the granules covering the surface become dark in-color.

For example, while white-colored asphalt shingles can have solar reflectance in the range of 25-35%, dark-colored asphalt shingles can have solar reflectance in the range of only 5-15%. Furthermore, except in the white or very light colors, there is typically only a very small amount of pigment in the conventional granule's color coating that reflects solar radiation well.

There is a need for an asphalt shingle that has solar reflectivity greater than 25% to reduce the solar heat absorption, while providing aesthetically pleasing, non-white colors to maintain the aesthetic value of roofing assembly.

There is a continuing need for roofing materials, and especially asphalt shingles, that have improved resistance to thermal stresses while providing an attractive appearance.

In particular, there is a need for roofing shingles that provide increased solar heat reflectance to reduce the solar absorption of the shingles, while providing a wide range of colors including deep-tone colors to maintain the aesthetic value of the system.

SUMMARY OF THE INVENTION

The present invention provides roofing shingles that provide increased solar heat reflectance, while providing deep-tone colors, as well as processes for their production.

In a presently preferred first embodiment, the present invention provides a method for making an infrared-reflective, deep-tone roofing product. This method comprises coating a fibrous web with a bituminous coating at an elevated temperature to form a bitumen-coated web, applying at least one powder of an infrared-reflective material to the bitumen-coated web, and then applying roofing granules to the bitumen-coated web.

In a presently preferred first embodiment, the present invention also provides an infrared-reflective, deep-tone roofing product, in the form, for example, of asphalt shingles. This roofing product comprises a fibrous web coated with a bituminous coating forming a bitumen-coated web, a coating of at least one powder of an infrared-reflective material applied to the bitumen-coated web, and roofing granules applied to the bitumen-coated web.

In a second presently preferred embodiment, the present invention provides a second method for making an infrared-reflective, deep-tone roofing product. The second method comprises coating a fibrous web with a bituminous coating at an elevated temperature to form a bitumen-coated web, and applying a coating material to the bitumen-coated web. The coating material comprises a carrier, and at least one powder of an infrared-reflective material to the bitumen-coated web. The second method further comprises applying roofing granules to the bitumen-coated web.

Preferably, the coating material has a melting or softening temperature less than the surface temperature of the bitumen-coated web, such that the coating material melts or softens upon application to the bitumen-coated web.

In a second presently preferred embodiment, the present invention provides a second infrared-reflective, deep-tone roofing product. The second roofing product comprises a fibrous web coated with a bituminous coating forming a bitumen-coated web, a coating material including a carrier and at least one powder of an infrared-reflective material applied to the bitumen-coated web, and roofing granules applied to the bitumen-coated web.

In a third presently preferred embodiment, the present invention provides a third method for making an infrared-reflective, deep-tone roofing product. The third method comprises coating a fibrous web with a bituminous coating at an elevated temperature to form a bitumen-coated web, and applying a coating film to the bitumen-coated web. The coating film comprises a film carrier, and at least one powder of an infrared-reflective material to the bitumen-coated web. The method further comprises applying roofing granules to the bitumen-coated web. Preferably, the coating film has a melting temperature less than the surface temperature of the bitumen-coated web, and the coating film melts, preferably at least partially, upon application to the bitumen-coated web to adhere the coating film to the bitumen-coated web. Preferably, the coating film upon melting also helps to adhere the roofing granules to the bitumen-coated web.

In a third presently preferred embodiment, the present invention provides a third infrared-reflective, deep-tone roofing product. This third infrared-reflective, deep-tone roofing product comprises a fibrous web coated with a bituminous coating forming a bitumen-coated web, a coating film including a film carrier and at least one powder of an infrared-reflective material applied to the bitumen-coated web, and roofing granules applied to the bitumen-coated web.

In a fourth presently preferred embodiment, the present invention provides a fourth method for making an infrared-reflective, deep-tone roofing product. The fourth method comprises a method for making an infrared-reflective, deep-tone roofing product. The method comprises coating a fibrous web with a bituminous coating at an elevated temperature to form a bitumen-coated web, and then applying a coating web to the bitumen-coated web. The coating web comprises a web carrier, at least one powder of an infrared-reflective material adhered to the bitumen-coated web, and roofing granules. Preferably, the web carrier has a melting temperature less than the surface temperature of the bitumen-coated web, and the web carrier melts, preferably at least partially, upon application to the bitumen-coated web.

In a fourth presently preferred embodiment, the present invention provides a fourth infrared-reflective, deep-tone roofing product. This fourth infrared-reflective, deep-tone roofing product comprises a fibrous web coated with a bituminous coating forming a bitumen-coated web, and a coating web including a web carrier, at least one powder of an infrared-reflective material and roofing granules, the coating web being applied to the bitumen-coated web.

In a fifth presently preferred embodiment, the present invention provides a fifth method for making an infrared-reflective, deep-tone roofing product. The fifth method comprises coating a fibrous web with a bituminous coating at an elevated temperature to form a bitumen-coated web, applying roofing granules to the bitumen-coated web to form an intermediate product; and applying a coating film to the intermediate product. Optionally, additional heat may be applied to fuse the coating film to the intermediate product. The coating film comprises a film carrier, and at least one powder of an infrared-reflective material. Preferably, the coating film has a melting temperature less than the surface temperature of the intermediate product, and the coating film melts upon application to the intermediate product to adhere the coating film to the intermediate product. Alternatively, the coating film may be applied to the intermediate product and subsequently provided with heat to adhere the coating film to the intermediate product.

In a fifth presently preferred embodiment, the present invention provides a fifth infrared-reflective, deep-tone roofing product. This fifth infrared-reflective, deep-tone roofing product comprises a fibrous web coated with a bituminous coating forming a bitumen-coated web, roofing granules applied to the bitumen-coated web to form an intermediate product, and a coating film including a film carrier and at least one powder of an infrared-reflective material applied to the intermediate product.

In a sixth presently preferred embodiment, the present invention provides a sixth method for making an infrared-reflective, deep-tone roofing product. The sixth method comprises coating a fibrous web with a bituminous coating at an elevated temperature to form a bitumen-coated web, applying roofing granules to the bitumen-coated web to form an intermediate product; and applying a coating material to the intermediate product. The coating material comprises a fluid carrier, and at least one powder of an infrared-reflective material.

Preferably, in each of the above embodiments, the roofing granules comprise infrared-reflective roofing granules. However, the roofing granules can comprise conventional roofing granules or a blend of conventional roofing granules and infrared-reflective roofing granules.

Preferably, in each of the above embodiments, the at least one powder is selected from the group consisting of titanium dioxide pigments, nickel titanate pigments, chrome titanate pigments, nano-$TiO_2$ particles, light-interference platelet pigments, pearlescent pigments, metal-oxide coated substrate pigments, iron oxide yellow pigments, iron titanium oxides, metal flakes, light-scattering pigments, and mirrorized fillers. It is also preferred in each of the above embodiments that the colored infrared-reflective roofing product has an L* value of less than 55 and a solar reflectance of greater than 25 percent.

The above-referenced presently preferred embodiments of the method of the present invention provide infrared-reflective material in between the portions of the surface of the roofing product covered by roofing granules. Preferably, the above-referenced methods of the present invention provide infrared-reflective material to cover at least 75 percent of the surface area of the roofing product not otherwise covered by roofing granules, more preferably at least about 90 percent, and even more preferably at least about 95 percent.

In a seventh presently preferred embodiment, the present invention provides a seventh method for making infrared-reflective roofing products. The seventh method comprises coating a fibrous web with a bituminous coating at an elevated temperature to form a bitumen-coated web; applying roofing granules to the bitumen-coated web, the roofing granules including (a) at least 50 percent by weight off-white mineral particles comprising $Al_2O_3$ and $SiO_2$, and having a solar reflectance greater than 30 percent while having and L* of less than about 60 percent, and (b) mineral particles selected from the group consisting of conventional colored roofing granules, and infrared-reflective roofing granules. In this embodiment, the aluminum oxide content is preferably less than that of silicon dioxide in order that the granules have an off-white color.

DETAILED DESCRIPTION OF THE PREFERRED EMBODIMENTS

The present invention provides solutions to problems associated with the high solar energy absorption of deep-tone asphalt-based roofing shingles. As used in the present specification and claims, unless otherwise indicated, "deep-tone" is defined to mean a color having a CIE color parameter L*<60.

As used in the present specification, "colored" means having an L* value of less than 85, preferably less than 55, even more preferably less than 45, when measured using a HunterLab Model Labscan XE spectrophotometer using a 0 degree viewing angle, a 45 degree illumination angle, a 10 degree standard observer, and a D-65 illuminant. "Colored" as so defined is intended to include relatively dark tones.

As used in the present specification, the strength in color space E* is defined as $E^*=(L^{*2}+a^{*2}+b^{*2})^{1/2}$, where L*, a*, and b* are the color measurements for a given sample using the 1976 CIE L*a*b* color space. The total color difference $\Delta E^*$ is defined as $\Delta E^*=(\Delta L^{*2}+\Delta a^{*2}+\Delta b^{*2})^{1/2}$ where $\Delta L^*$, $\Delta a^*$, and $\Delta b^*$ are respectively the differences in L*, a* and b* for two different color measurements.

In one aspect of the bituminous roofing products of the present invention, the colored roofing granules have increased solar heat reflectance in comparison with conventional colored roofing granules. In another aspect of the present invention, the bituminous coating of the roofing product has increased solar heat reflectance. In yet another aspect of the present invention, both the colored roofing granules and the bituminous coating have increased solar heat reflectance.

In the present specification and claims, the terms "solar heat reflectance" and "infrared reflectance" are used interchangeably.

Since 80-90% of the surface of an asphalt shingle is covered by pigmented roofing granules, it is desirable to first increase the solar reflectance of the roofing granules, especially in the near infrared range of solar-heating spectrum.

Methods to produce colored roofing granules with higher solar reflectance and such roofing granules are disclosed in U.S. patent application Ser. No. 10/679,898, filed Oct. 6, 2003, incorporated herein in its entirety by reference. These colored roofing granules with higher solar heat reflectance can be directly incorporated into traditional shingle manufacturing lines to enhance shingle solar heat reflectance.

In addition, the solar heat reflectance of the 10-20% asphalt coating area exposed to solar radiation can be increased by the processes of the present invention.

For light-colored roofing products, such as light-colored asphalt shingles with 50<L*<60 and solar reflectance between 18% to less than 25%, the solar heat reflectance of the roofing product can be increased to above 25% by increasing the solar heat reflectance of the bituminous coating or areas of the top surface of the shingle not covered by roofing granules using methods described below, without the need to enhance the solar heat reflectance of existing colored roofing granules.

For deep-tone roofing products with L*<50, the infrared reflectance of the roofing product can be increased by increasing the solar heat reflectance of the bituminous coating by using the methods described below in combination with employing infrared-reflective colored roofing granules.

According to a first presently preferred embodiment of the present invention, infrared-reflective roofing products can be prepared by a method comprising coating a fibrous web with a bituminous coating at an elevated temperature to form a bitumen-coated web; applying at least one powder of an infrared-reflective material, such as a pigment or filler, to the bitumen-coated web; and applying roofing granules to the bitumen-coated web.

Preferably, to enhance the infrared-reflectance of the surface of the bituminous coating, the at least one powder of the infrared-reflective material can be directly deposited onto the surface of the bituminous coating after the application of bituminous material, and either before the application of roofing granules or after the application of roofing granules. The bituminous coating is typically applied to the fibrous web as a viscous, tacky, molten liquid material, and the at least one powder of infrared-reflective material is preferably directly deposited on the surface of the bituminous coating while the bituminous material is still warm and tacky, so that the at least one powder of infrared-reflective material adheres to the surface of the bitumen-coated web.

Preferably, the at least one powder of infrared-reflective material is applied to the surface of the bitumen-coated web at an application rate effective to increase the solar heat reflectance of the roofing product by at least about 3 percent, and more preferably by at least about 5 percent or more; in comparison with roofing product that has not been coated with the at least one powder of infrared-reflective material.

The at least one infrared-reflective material is preferably applied in powder form. Preferably, the powder of the at least one infrared-reflective material has an average particle size and particle size distribution-such that the gaps between the roofing granules deposited on the bitumen-coated web are effectively covered by the powder of the at least one infrared-reflective material. Preferably, the powder of the at least one infrared-reflective material has an average particle size between about 0.1 micron and about 250 microns, more preferably between about 0.2 micron and about 100 microns, and even more preferably between about 0.3 micron and 50 microns. Presently preferred pearlescent pigments have an average particle size of about 20 microns, while presently preferred titanium dioxide pigments have an average particle size in the range from about 0.3 microns to 1 micron. Alternatively, the preferred particle size of the at least one infrared-reflective material can be characterized in terms of material passing through standard mesh sizes. Thus, it is preferred that the at least one infrared-reflective material have a particle size such that the material pass 60 mesh, more preferably 140 mesh, and still more preferably 270 mesh.

The rate of application of the infrared-reflective material to the bitumen-coated web depends upon a variety of factors, including the particle size of the infrared-reflective material, the morphology of the infrared-reflective material, et al. Preferably, the infrared-reflective material is applied to the surface of the bitumen-coated web at a rate sufficient to provide substantial coverage of the surface of the bitumen-coated web by the at least one powder of infrared-reflective material. In particular, it is presently preferred that the at least one powder of infrared-reflective material be applied at a rate sufficient to cover at least about 80 percent of the surface of the bitumen-coated web, more preferably, at least about 85 percent of the surface of the bitumen-coated web, and yet more preferably at least about 90 percent of the surface of the bitumen-coated web, as determined by a suitable technique, depending on the average particle size of the particles. It is particularly preferred that the portion of the surface of the bitumen-coated web exposed after the application of roofing granules has substantial coverage by the at least one powder of infrared-reflective material. For example, particle surface coverage can be measured using image analysis of optical micrographs, such as optical micrographs obtained at a magnification of 200× using polarized light using a CCD camera (Sony 950MD) and subsequently digitized to a 16-bit gray scale image using suitable software, such as Image-Pro Plus from Media Cybernetics, Inc., Silver Spring, Md. 20910. In this technique, the shingle surface area is recorded in a black and white image using a CCD camera fitted to a microscope. The image can then be separated into an asphalt coating portion and a granule-covered portion using the threshold method in gray scale. The amount of granule coverage can then be calculated by the image analysis software based upon the number of pixels with a gray scale above the threshold level divided by the total number of pixels in the image. A similar technique could be employed to determine the amount of infrared-reflective material coverage. Alternatively, when the infrared-reflective material has an average particle size below the working range of a light microscope, a scanning electron microscope can be used in conjunction with elemental analysis of the surface area mapped by the SEM to assess surface coverage.

Suitable infrared-reflective materials include, but are not limited to, titanium dioxide pigments, nickel titanates, chrome titanates, nano-$TiO_2$ particles, light-interference platelet pigments, pearlescent pigments, metal-oxide coated substrate pigments, iron oxide yellow pigments, iron titanium oxides, metal flakes, silica encapsulated metal flakes, light-scattering pigments, and mirrorized fillers.

Preferably, the infrared-reflective material applied to the surface of bitumen-coated web should adhere to the surface of the bitumen-coated web, while not significantly negatively affecting the adhesion of roofing granules to the bitumen-coated web or the color or appearance of the finished roofing product.

The at least one powder of infrared-reflective material can be simply dropped onto the moving surface of the bitumen-coated web before the roofing granules are applied to the moving surface. Alternatively, the at least one powder of infrared-reflective material can be dropped onto the moving surface of the bitumen-coated web after the roofing granules are applied to the moving surface, or after the roofing granules have been pressed into the moving surface to improve adhesion of the roofing granules to the bitumen-coated web.

Figure 1:
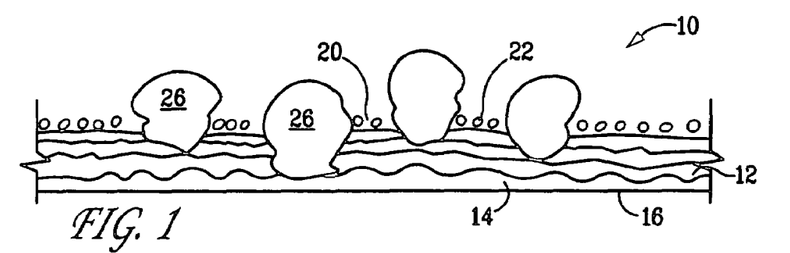
FIG. 1 is a schematic illustration of the structure of an infrared-reflective, deep-tone roofing product according to a first embodiment of the present invention.
Figure 7:
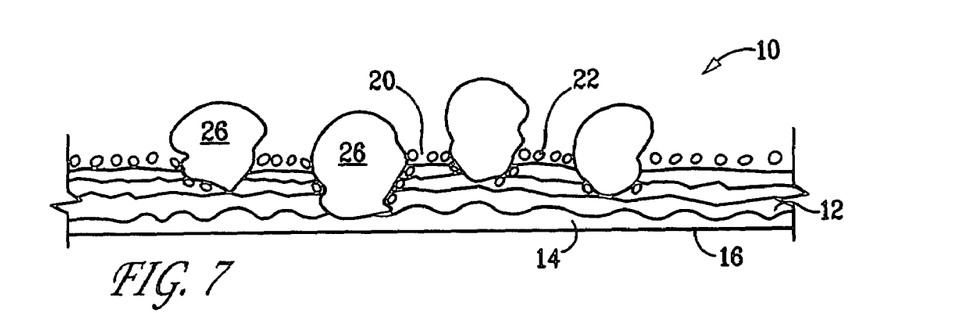
FIG. 7 is a schematic illustration of the structure of an infrared-reflective, deep-tone roofing product according to a variation of first embodiment of the present invention.

FIG. 1 is a schematic illustration of an infrared-reflective roofing product 10 according to the first embodiment of the present invention. The roofing product 10 comprises a fibrous web 12 coated with a bituminous coating 14 forming a bitumen-coated web 16, as well as a coating 20 of at least one powder of an infrared-reflective material 22 applied to the bitumen-coated web 16, and roofing granules 26 applied to the bitumen-coated web 16. In the infrared-roofing product 10 of FIG. 1, the at least one powder of an infrared-reflective material 22 has been applied to the bitumen-coated web 16 after the roofing granules 26. However, the infrared-reflective roofing product 10 of the present invention can also be prepared by applying the at least one powder of infrared-reflective material 22 before the roofing granules 26 are applied to the bitumen-coated web 16, resulting in the infrared-reflective product 10 shown schematically in FIG. 7, in which some of the particles of the at least one infrared-reflective material 22 are to be found under the roofing granules 26.

According to a second presently preferred embodiment of the present invention, infrared-reflective roofing products can be prepared by a method comprising coating a fibrous web with a bituminous coating at an elevated temperature to form a bitumen-coated web; applying a coating material comprising a carrier and at least one powder of an infrared-reflective material, such as a pigment or filler, to the bitumen-coated web; and applying roofing granules to the bitumen-coated web.

Preferably, the coating material has a melting or softening temperature less than the surface temperature of the bitumen-coated web. More preferably the melting temperature of the coating material is about 50-150 degrees Centigrade less than the surface temperature of the bitumen-coated web. Even more preferably, the melting temperature of the coating material should have a broad range at least 70-100 degrees Centigrade less than the surface temperature of the asphalt. The coating material thus preferably melts upon application to the bitumen-coated web, and is thus distributed upon and adhered to the surface of the bitumen-coated web.

The coating material is preferably pre-dispersed and includes at least one infrared-reflective material and a carrier material. The coating material is preferably a fine powder that can be deposited on the surface of the bitumen-coated web, or droplet-forming liquid that can be sprayed onto the surface of the bitumen-coated web. When the carrier material is solid, the surface of the bitumen-coated web is preferably sufficiently hot so that the carrier material melts or at least softens upon contact with the bitumen-coated web. The coating material so deposited preferably forms a continuous film on the surface of the bitumen-coated web.

The coating material can be applied directly to the surface of the bitumen-coated web before application of the roofing granules to the bitumen-coated web. In the alternative, when the coating material takes the form of a solid, the coating material can be blended with the roofing granules, and the blend of roofing granules and coating material can then be applied to the surface of the bitumen-coated web.

Preferably, the coating material will contact the bitumen-coated web when the bitumen-coated web has a temperature at around 400-450° F. (204-232° C.), and the carrier will melt or flow to form a thin film on the surface of the bitumen-coated web to affix the infrared-reflective material to the bitumen-coated web in order to enhance the infrared-reflectance of the roofing product.

As used in the present specification and claims, a "carrier" for the at least one powder can be liquid or solid, a film or a particulate, a polymer, or an organic solvent or water, or a solvent or water-borne coating.

Examples of carrier materials include thermoplastic polymeric materials having a suitable glass or crystalline transition temperature such as disclosed, for example, in D. W. Van Krevelen et al., *Properties of Polymers, Correlations with Chemical Structure* (Elsevier Publishing Company, New York, 1972). Suitable thermoplastic materials include poly (meth)acrylates having an appropriate monomer composition including acrylic homopolymers such as poly ethyl acrylate, poly isohexyl acrylate, and poly n-butyl acrylate, copolymers of ethyl acrylate and methyl methacrylate, copolymers of ethyl acrylate, butyl acrylate and methyl methacrylate, copolymers of ethyl acrylate, n-butyl acrylate and methacrylic acid, copolymers of methyl methacrylate, ethyl acrylate and acrylic acid, copolymers of ethyl acrylate, n-butyl acrylate, styrene, and acrylic acid, and the like; polyolefins such as polyethylene, polypropylene, and polybutylene; olefinic copolymers such as copolymers of ethylene and vinyl acetate, copolymers of ethylene and ethyl acrylate, copolymers of ethylene and acrylic acid, copolymers of ethylene and methacrylic acid, copolymers of ethylene, vinyl acetate and acrylic acid, and the like; ethylene propylene diene monomer copolymers; block copolymers such as styrene-butadiene-styrene-butadiene triblock copolymer, styrene-isoprene-styrene triblock copolymer, ionomers such as ethylene methyl methacrylic acid ionically crosslinked ionomers, polyurethanes, polysiloxanes, et al. Further blends of polymeric materials can be employed. Preferably, the monomer composition is selected to provide the desired melting or softening properties to the polymeric carrier material. Preferably, the carrier material comprises a thermoplastic polymeric material having excellent resistance to degradation by exposure to ultraviolet radiation, and, in particular, acrylic polymeric materials are especially preferred for their superior ultraviolet resistance. The carrier material can also include suitable plasticizers, reactive diluents, and the like to adjust the effective melting temperature of the polymeric material, as well as tackifying resins such as aromatic modified hydrocarbon resins and similar modifiers to increase the adhesion of the carrier material. In addition, the carrier material can include surfactants, pigment dispersants, and the like, to aid in dispersing the particles of the infrared-reflective pigment, granulating aids to aid in the preparation of appropriately-sized particles, flow and rheology modifiers to enhance application properties, and like additives.

The carrier material is preferably formulated to be sufficiently hydrophobic to resist weather-driven exposure to moisture. Thus, natural and synthetic waxes including paraffin can also be used as a carrier material.

The coating material can also include additives, such as algaecides, impact modifiers, UV stabilizers, and/or crack-healing agents, to introduce additional functionalities to the asphalt shingles, such as, for example, algae-resistance, impact resistance, or better durability.

A method of improving adhesion between roofing granules and asphalt coating using non-asphalt adhesives or a thermoplastic adhesive interface by spraying onto hot asphalt surface prior to granule drops has been disclosed in U.S. Pat. Nos. 5,380,552 and 5,516,573. Preferably, such an adhesive is modified for use in the present invention by including at least one infrared-reflective material.

Figure 2:
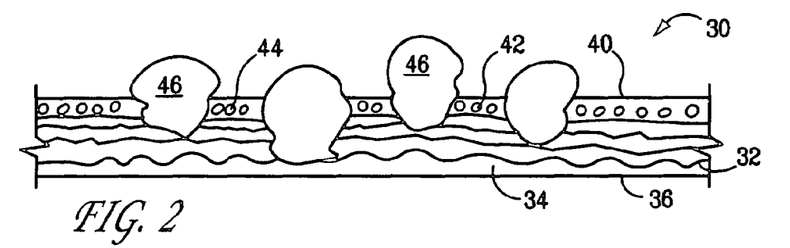
FIG. 2 is a schematic illustration of the structure of an infrared-reflective roofing product according to a second embodiment of the present invention.

FIG. 2 is a schematic illustration of an infrared-reflective roofing product 30 according to the second embodiment of the present invention. The roofing product 30 comprises a fibrous web 32 coated with a bituminous coating 34 forming a bitumen-coated web 36, as well as a coating material 40 including a carrier 42 and at least one powder of an infrared-reflective material 44 applied to the bitumen-coated web 36, and roofing granules 46 applied to the bitumen-coated web 36.

According to a third presently preferred embodiment of the present invention, infrared-reflective roofing products can be prepared by a method comprising coating a fibrous web with a bituminous coating at an elevated temperature to form a bitumen-coated web; applying a coating film comprising a film carrier and at least one powder of an infrared-reflective material, such as a pigment or filler, to the bitumen-coated web; and applying roofing granules to the bitumen-coated web. Preferably, the coating film is directly laminated onto the bitumen-coated web. Preferably, the coating film is directly laminated to bitumen-coated web while the bitumen-coated web is at an elevated temperature sufficient to at least partially fuse the film carrier to help adhere the coating film to the bitumen-coated web.

Preferably, adherence of the coating film to the bitumen-coated carrier does not significantly negatively affect adherence of the roofing granules to the bitumen-coated web.

The coating film can be applied as a film, as a liquid that solidifies to become a film, or as a liquid that contains components that form a film after application.

Examples of materials suitable for use as a film carrier include thermoplastic materials such as discussed in reference to the second presently preferred embodiment of the process of the present invention.

Preferably, the coating film has sufficient thickness and mechanical strength to ensure facile handling and mechanical application of the film. Preferably, the coating film has a thickness of from about 20 to 250 microns, more preferably from about 20 to 200 microns, and even more preferably from about 25 to 150 microns. Overly thick films are to be avoided, in that they can pose handling, draping and heat transfer problems in application. It is preferred that the weight percentage of the at least one powder of infrared-reflective material to film carrier in the coating film be from about 2 to about 60 percent, more preferably from about 5 to about 40 percent, and still more preferably from about 10 to 35 percent.

Additives can be included in the coating film to introduce additional functionalities to the finished roofing product. Examples of such additives include algaecides, impact modifiers, UV stabilizers, and/or crack-healing agents, to introduce additional functionalities to the asphalt shingles, such as, for example, algae-resistance, impact resistance, or better durability. In addition, additives can be employed to enhance the properties of the coating film, such as solvents, plasticizers and tackifiers, flow modifiers, and adhesion promoters. The surface of the coating film can be optionally coated with a suitable lamination adhesive.

Figure 3:
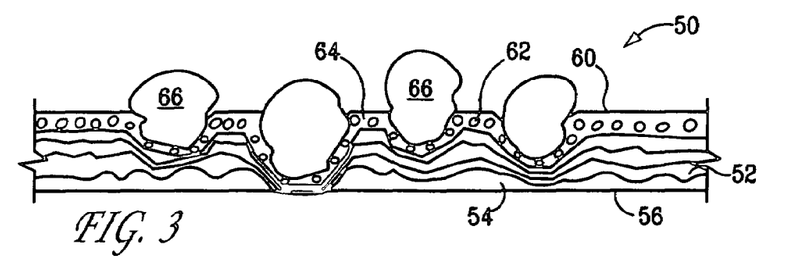
FIG. 3 is a schematic illustration of the structure of an infrared-reflective roofing product according to a third embodiment of the present invention.

FIG. 3 is a schematic illustration of an infrared-reflective roofing product 50 according to the third embodiment of the present invention. The roofing product 50 comprises a fibrous web 52 coated with a bituminous coating 54 forming a bitumen-coated web 56, as well as a coating film 60 including a film carrier 62 and at least one powder of an infrared-reflective material 64 applied to the bitumen-coated web 56, and roofing granules 66 applied to the bitumen-coated web 56.

According to a fourth presently preferred embodiment of the present invention, infrared-reflective roofing products can be prepared by a method comprising coating a fibrous web with a bituminous coating at an elevated temperature to form a bitumen-coated web; applying a coating web comprising a web carrier, at least one powder of an infrared-reflective material, such as a pigment or filler, and roofing granules, to the bitumen-coated web. Preferably, the coating web is directly laminated onto the bitumen-coated web. Preferably, the coating web is directly laminated to bitumen-coated web while the bitumen-coated web is at an elevated temperature sufficient to at least partially fuse the web carrier to help adhere the coating film to the bitumen-coated web.

The web carrier holding the roofing granules together should have sufficient modulus and the ability to withstand the temperatures of hot bituminous coating without disintegration, while adhering to and covering the bitumen-coated web resulting in higher solar reflectance. An example of a suitable web carrier is disclosed in U.S. Patent Application Publication No. 2002/0160151A1, incorporated herein by reference.

Figure 4:
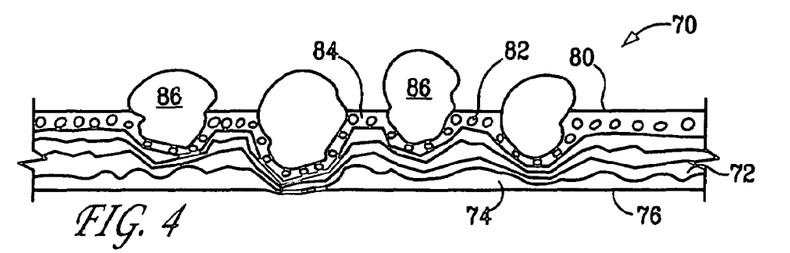
FIG. 4 is a schematic illustration of the structure of an infrared-reflective roofing product according to a fourth embodiment of the present invention.

FIG. 4 is a schematic illustration of an infrared-reflective, deep-tone roofing product 70 according to the fourth embodiment of the present invention. The roofing product 70 comprises a fibrous web 72 coated with a bituminous coating 74 forming a bitumen-coated web 76, as well as a coating web 80 including a web carrier 82, at least one powder of an infrared-reflective material 84, and roofing granules 86, applied to the bitumen-coated web 76.

According to a fifth presently preferred embodiment of the present invention, infrared-reflective roofing products can be prepared by a method comprising coating a fibrous web with a bituminous coating at an elevated temperature to form a bitumen-coated web; applying roofing granules to the bitumen-coated web to form an intermediate product, and then applying a coating film to the intermediate product. The coating film comprises a film carrier and at least one powder of an infrared-reflective material, such as a pigment or filler. Preferably, the coating web is a coating film that is directly laminated onto the bitumen-coated web. Preferably, the coating web is directly laminated to intermediate product while the intermediate product is at an elevated temperature sufficient to at least partially fuse the web carrier to help adhere the coating film to the intermediate product.

This fifth embodiment of the present invention provides yet another method to increase the solar reflectance of shingles with $L^*<60$ to above 25%.

The coating film or adhesive containing the at least one infrared-reflective material is preferably laminated directly onto the surface of otherwise completely constructed roofing product or intermediate material, preferably before the material is cut to size to form, for example, roofing shingles.

The film carrier is preferably a thin film, with a thickness of from about 20 to about 250 microns, more preferably from about 25 to about 150 microns.

The film carrier preferably has the ability to conform to the irregular, granular surface of the roofing product or shingle, or has the ability to adhere to the roofing product surface by either thermal setting or other suitable means.

Although such film carriers bearing infrared-reflective materials may be colored, it is more desirable to employ a transparent or semi-transparent film carrier that has increased infrared-reflectance by using transparent infrared-reflective pigments, such as for example, light-interference platelet pigments or nano-$TiO_2$ particles. As used in the present specification and claims, transparency is determined in terms of the opacity of the material, and "transparent" means having a contrast ratio of less than about 30 percent, while "semi-transparent" means contrast ration of less than about 80 percent. The contrast ratio is measured by applying a coating or mounting a film of the specimen material over a Leneta BW chart and measuring the color, and calculating the ratio of $L^*$ of the coating or film over the black substrate divided by $L^*$ of the coating or film over the white substrate, and expressing the ratio as a percentage of the $L^*$ measured for the white substrate. A coating having a higher contrast ratio, or hiding power, is more opaque, while a lower contrast ratio is more transparent. Thus, a coating having the same $L^*$ measurement over both the black and white substrates would have a contrast ratio of 100%, and would be opaque or non-transparent.

Figure 5:
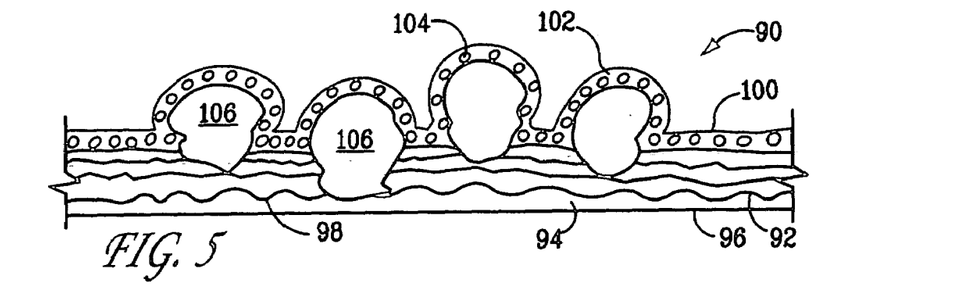
FIG. 5 is a schematic illustration of the structure of an infrared-reflective roofing product according to a fifth embodiment of the present invention.

FIG. 5 is a schematic illustration of an infrared-reflective roofing product 90 according to the fifth embodiment of the present invention. The roofing product 90 comprises a fibrous web 92 coated with a bituminous coating 94 forming a bitumen-coated web 96, and roofing granules 106 embedded in the bitumen-coated web 96 to form an intermediate product 98, as well as a coating film 100 including a film carrier 102, and at least one powder of an infrared-reflective material 104, applied to the intermediate product 98.

According to a sixth presently preferred embodiment of the present invention, infrared-reflective roofing products can be prepared by a method comprising coating a fibrous web with a bituminous coating at an elevated temperature to form a bitumen-coated web; applying roofing granules to the bitumen-coated web to form an intermediate product, and then applying a coating fluid to the intermediate product. The coating fluid comprises a fluid carrier and at least one powder of an infrared-reflective material, such as a pigment or filler. Preferably, the coating fluid is applied by spraying the coating fluid directly onto the bitumen-coated web. Preferably, the coating fluid is directly applied to intermediate product while the intermediate product is at an elevated temperature sufficient to help adhere the coating fluid to the intermediate product.

This sixth embodiment provides yet another method to increase the solar heat reflectance of a shingle with $L^*<60$.

The coating fluid or adhesive can have desirable colors to achieve aesthetic values, or can be transparent or semitransparent in the visible spectrum when cured to reveal the actual shingle colors.

Examples of fluid carriers that can be employed in the process of the present invention include aqueous emulsions of synthetic polymers, such as aqueous emulsions of acrylic polymers, such as emulsion copolymers of (meth)acrylic esters, amides and acids. For example, emulsion copolymers of ethyl acrylate, butyl acrylate, methylmethacrylate and acrylic acid can be employed. Polymers having good exterior weathering properties, such as the acrylic polymers and copolymers are preferred. Solvent based synthetic polymers, such as organic solvent based (meth)acrylic copolymers, can also be employed as fluid carriers in the process of the present invention. One hundred percent-solids two-part reactive coatings could also be used, such as coatings based on polyurethanes, polyureas and polyepoxides. Examples of polyurea-type reactive coatings, based on aspartic acid ester ureas, are disclosed in U.S. Pat. No. 6,451,874. Examples of two-part reactive epoxy systems cured with an amine-free $SbF_5$ alcohol complex are disclosed in U.S. Pat. No. 5,731,369.

The coating fluid can also include conventional coatings adjuvants and additives. The coating fluid can be water-based or solvent-based, or alternatively, substantially free of solvents. Water-based coating fluids can include, for example, water, cosolvents, dispersants, emulsifiers, coloring materials, preservatives, coalescents, and the like. In the case of water-based coating fluids, such water-based coating fluids have total solids of from about 10 to about 70 percent by weight, and more preferably from about 30 to about 60 percent by weight. In the case of solvent-based coating fluids, such solid-based coating fluids have total solids of at least about 50 percent by weight, more preferably at least about 70 percent by weight, and even more preferably are substantially free of solvents. Preferably, the coating fluids have a volatile organic content (VOC) of less than about 450 g/L, more preferably less than about 250 g/L, and even more preferably less than about 100 g/L VOC as applied.

Other additives can also be incorporated into the coating fluid to add desirable functionalities to the finished roofing product. Examples of such other additives include but are not limited to plasticizers, wetting agents, coalescing agents, and flow modifiers.

Figure 6:
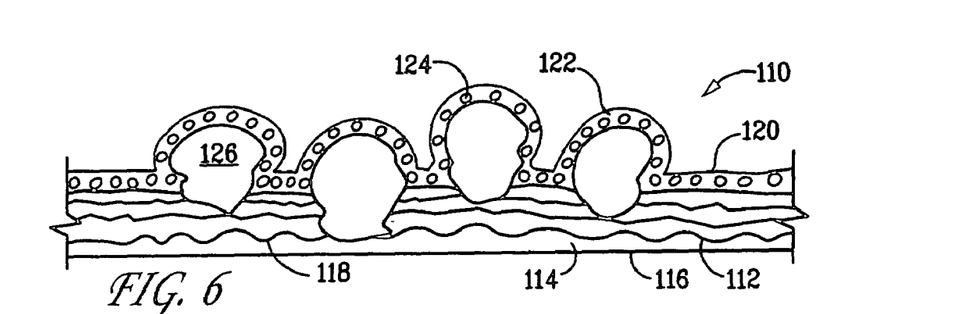
FIG. 6 is a schematic illustration of the structure of an infrared-reflective roofing product according to a sixth embodiment of the present invention.

FIG. 6 is a schematic illustration of an infrared-reflective roofing product 110 according to the sixth embodiment of the present invention. The roofing product 110 comprises a fibrous web 112 coated with a bituminous coating 114 forming a bitumen-coated web 116, and roofing granules 126 embedded in the bitumen-coated web 116 to form an intermediate product 118, as well as a coating fluid 120 including a fluid carrier 122, and at least one powder of an infrared-reflective material 124, applied to the intermediate product 118.

The above-referenced presently preferred embodiments of the method of the present invention provide infrared-reflective material on the surface of the roofing product in between those portions of the surface of the roofing product which are covered by roofing granules. Preferably, the above-referenced methods of the present invention provide infrared-reflective material to cover at least about 75 percent of the surface area of the roofing product not otherwise covered by roofing granules, more preferably at least about 90 percent, and even more preferably at least about 95 percent. Thus, for example, if roofing granules cover about 85 percent of the surface area of the mineral product, it is preferred that the above-described methods of the present invention provide infrared-reflective material over at least about 75 percent of the remaining 15 percent of the surface area of the roofing product.

According to a seventh presently preferred embodiment of the present invention, infrared-reflective roofing products can be prepared by a method comprising coating a fibrous web with a bituminous coating at an elevated temperature to form a bitumen-coated web; applying roofing granules to the bitumen-coated web, the roofing granules including (a) at least 50 percent by weight off-white mineral particles comprising $Al_2O_3$ and $SiO_2$, preferably having a weight ratio of $Al_2O_3$ to $SiO_2$ from about 0.2:1 to about 1:1, and more preferably having a weight ratio of $A_2O_3$ to $SiO_2$ from about 0.7:1 to about 0.9:1, and having a solar reflectance greater than 30 percent while having and L* of less than about 60 percent, and (b) mineral particles selected from the group consisting of conventional colored roofing granules, and infrared-reflective roofing granules. The two types of mineral particles can be blended in combinations to generate desired colors. The blended mineral granules can be directly applied to the hot bituminous coating to form the shingle.

In this embodiment, it is important that the aluminum oxide content be less than that of silicon dioxide in order that the granules have an off-white color. If aluminum content becomes too high, the particles become white in color. Higher alumina content is also accompanied by increase in hardness that can negatively impact on the wear of machinery and cutters. The desired mineral granules can be obtained from commercially available refractory grog (available form Maryland Refractories Co., Irondale, Ohio) or from crushed natural feldspar rocks (for example, medium chip feldspar from Pacer Corp., Custer, S. Dak., which has solar reflectivity of 53%).

Figure 8:
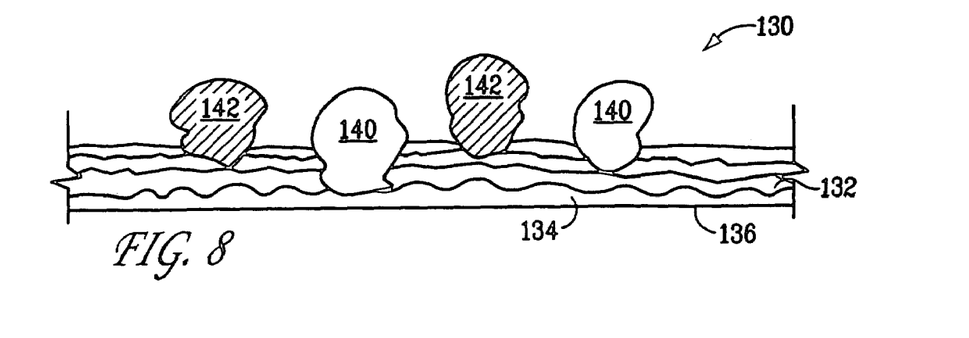
FIG. 8 is a schematic illustration of the structure of an infrared-reflective roofing product according to a seventh embodiment of the present invention.

FIG. 8 is a schematic illustration of an infrared-reflective roofing product 130 according to the seventh embodiment of the present invention. The roofing product 130 comprises a fibrous web 132 coated with a bituminous coating 134 forming a bitumen-coated web 136, and conventional roofing granules 140 as well as off-white mineral particles 142 embedded in the bitumen-coated web 136. The roofing product 130 may also optionally include at least one powder of an infrared-reflective material (not shown) within the construction of the roofing product 130.

Examples of near IR-reflective pigments available from the Shepherd Color Company, Cincinnati, Ohio, include Arctic Black 10C909 (chromium green-black), Black 411 (chromium iron oxide), Brown 12 (zinc iron chromite), Brown 8 (iron titanium brown spinel), and Yellow 193 (chrome antimony titanium).

Light-interference platelet pigments are known to give rise to various optical effects when incorporated in coatings, including opalescence or "pearlescence." Surprisingly, light-interference platelet pigments have been found to provide or enhance infrared-reflectance of roofing granules coated with compositions including such pigments. Also surprisingly, roofing products incorporating light-interference platelet pigments have been found to have enhanced infrared-reflectance when such pigments are included in other parts of a roofing product construction.

Examples of light-interference platelet pigments that can be employed in the process of the present invention include pigments available from Wenzhou Pearlescent Pigments Co., Ltd., No. 9 Small East District, Wenzhou Economical and Technical Development Zone, Peoples Republic of China, such as Taizhu TZ5013 (mica, rutile titanium dioxide and iron oxide, golden color), TZ5012 (mica, rutile titanium dioxide and iron oxide, golden color), TZ4013 (mica and iron oxide, wine red color), TZ4012 (mica and iron oxide, red brown color), TZ4011 (mica and iron oxide, bronze color), TZ2015 (mica and rutile titanium dioxide, interference green color), TZ2014 (mica and rutile titanium dioxide, interference blue color), TZ2013 (mica and rutile titanium dioxide, interference violet color), TZ2012 (mica and rutile titanium dioxide, interference red color), TZ2011 (mica and rutile titanium dioxide, interference golden color), TZ1222 (mica and rutile titanium dioxide, silver white color), TZ1004 (mica and anatase titanium dioxide, silver white color), TZ4001/600 (mica and iron oxide, bronze appearance), TZ5003/600 (mica, titanium oxide and iron oxide, gold appearance), TZ1001/80 (mica and titanium dioxide, off-white appearance), TZ2001/606 (mica, titanium dioxide, tin oxide, off-white/gold appearance), TZ2004/600 (mica, titanium dioxide, tin oxide, off-white/blue appearance), TZ2005/600 (mica, titanium dioxide, tin oxide, off-white/green appearance), and TZ4002/600 (mica and iron oxide, bronze appearance).

Examples of light-interference platelet pigments that can be employed in the process of the present invention also include pigments available from Merck KGaA, Darmstadt, Germany, such as Iriodin® pearlescent pigment based on mica covered with a thin layer of titanium dioxide and/or iron oxide; Xirallic™ high chrorma crystal effect pigment based upon $Al_2O_3$ platelets coated with metal oxides, including Xirallic T 60-10 WNT crystal silver, Xirallic T 60-20 WNT sunbeam gold, and Xirallic F 60-50 WNT fireside copper; ColorStream™ multi color effect pigments based on $SiO_2$ platelets coated with metal oxides, including ColorStream F 20-00 WNT autumn mystery and ColorStream F 20-07 WNT viola fantasy; and ultra interference pigments based on $TiO_2$ and mica.

Examples of mirrorized silica pigments that can be employed in the process of the present invention include pigments such as Chrom Brite™ CB4500, available from Bead Brite, 400 Oser Ave, Suite 600, Hauppauge, N.Y. 11788.

The infrared-reflective roofing shingles of the present invention can include roofing granules, powders, coatings or films including conventional coatings pigments. Examples of coatings pigments that can be used include those provided by the Color Division of Ferro Corporation, 4150 East 56th St., Cleveland, Ohio 44101, and produced using high temperature calcinations, including PC-9415 Yellow, PC-9416 Yellow, PC-9158 Autumn Gold, PC-9189 Bright Golden Yellow, V-9186 Iron-Free Chestnut Brown, V-780 Black, V0797 IR Black, V-9248 Blue, PC-9250 Bright Blue, PC-5686 Turquoise, V-13810 Red, V-12600 Camouflage Green, V12560 IR Green, V-778 IR Black, and V-799 Black. Further examples of coatings pigments that can be used include white titanium dioxide pigments provided by Du Pont de Nemours, P.O. Box 8070, Wilmington, Del. 19880.

The present invention provides mineral-surfaced roofing products including asphalt shingles, with CIE L* less than 85, more preferably less than about 55, and even more preferably less than about 45, and solar reflectance greater than 25%. Preferably, roofing products, such as asphalt shingles, according to the present invention comprise colored, infrared-reflective granules according to the present invention, and optionally, conventional colored roofing granules. Conventional colored roofing granules and infrared-reflective roofing granules can be blended in combinations to generate desirable colors. As noted above, in some of the embodiments of the present invention, the blend of granules can be then directly applied on to hot bituminous coating to form the roofing product. Examples of granule deposition apparatus that can be employed to manufacture roofing products, including asphalt shingles, according to the present invention are provided, for example, in U.S. Pat. Nos. 4,583,486, 5,795,389, and 6,610,147, and U.S. Patent Application Publication U.S. 2002/0092596, each incorporated herein by reference.

The process of the present invention advantageously permits the solar reflectance of the roofing products such as shingles employing the solar-reflective granules, powders, coatings or films to be tailored to achieve specific color effects.

The colored, infrared-reflective roofing products of the present invention, such as colored infrared-reflective roofing shingles, can be manufactured using conventional roofing production processes. Typically, bituminous roofing products are sheet goods that include a non-woven base or scrim formed of a fibrous material, such as a glass fiber scrim. The base is coated with one or more layers of a bituminous material such as asphalt to provide water and weather resistance to the roofing product. One side of the roofing product is typically coated with mineral granules to provide durability, reflect heat and solar radiation, and to protect the bituminous binder from environmental degradation. In the present invention, colored, infrared-reflective granules can be mixed with conventional roofing granules, and the granule mixture can be embedded in the surface of such bituminous roofing products using conventional methods. Alternatively, colored, infrared-reflective granules can be substituted for conventional roofing granules in manufacture of bituminous roofing products to provide those roofing products with solar reflectance.

Bituminous roofing products are typically manufactured in continuous processes in which a continuous substrate sheet of a fibrous material such as a continuous felt sheet or glass fiber mat is immersed in a bath of hot, fluid bituminous coating material so that the bituminous material saturates the substrate sheet and coats at least one side of the substrate. The reverse side of the substrate sheet can be coated with an anti-stick material such as a suitable mineral powder or a fine sand. Roofing granules are then distributed over selected portions of the top of the sheet, and the bituminous material serves as an adhesive to bind the roofing granules to the sheet when the bituminous material has cooled. The sheet can then be cut into conventional shingle sizes and shapes (such as one foot by three feet rectangles), slots can be cut in the shingles to provide a plurality of "tabs" for ease of installation or for aesthetic effects, additional bituminous adhesive can be applied in strategic locations and covered with release paper to provide for securing successive courses of shingles during roof installation, and the finished shingles can be packaged. More complex methods of shingle construction can also be employed, such as building up multiple layers of sheet in selected portions of the shingle to provide an enhanced visual appearance, or to simulate other types of roofing products. Alternatively, the sheet can be formed into membranes or roll goods for commercial or industrial roofing applications.

The bituminous material used in manufacturing roofing products according to the present invention is derived from a petroleum-processing by-product such as pitch, "straight-run" bitumen, or "blown" bitumen. The bituminous material can be modified with extender materials such as oils, petroleum extracts, and/or petroleum residues. The bituminous material can include various modifying ingredients such as polymeric materials such as, for example, SBS (styrene-butadiene-styrene) block copolymers, resins, flame-retardant materials, oils, stabilizing materials, anti-static compounds, and the like. Preferably, the total amount by weight of such modifying ingredients is not more than about 15 percent of the total weight of the bituminous material. The bituminous material can also include amorphous polyolefins, up to about 25 percent by weight. Examples of suitable amorphous polyolefins include atactic polypropylene, ethylene-propylene rubber, etc. Preferably, the amorphous polyolefins employed have a softening point of from about 130 degrees C. to about 160 degrees C. The bituminous composition can also include a suitable filler, such as calcium carbonate, talc, carbon black, stone dust, or fly ash, preferably in an amount from about 10 percent to 70 percent by weight of the bituminous composite material.

The following examples are provided to better disclose and teach processes and compositions of the present invention. They are for illustrative purposes only, and it must be acknowledged that minor variations and changes can be made without materially affecting the spirit and scope of the invention as recited in the claims that follow.

EXAMPLE 1

Asphalt panels about 4"×4"×⅛" thick were prepared on an aluminum backing by using coating grade asphalt from a Venezuelan crude source and filled with 63 wt % calcium carbonate fillers to achieve viscosity of 2600 cps at 400° F. The resultant asphalt panel has only 5.2% solar heat reflectance as measured by the ASTM C1549 method using a portable solar reflectometer (Model SSR-E from Devices & Services, Dallas, Tex.). To increase the solar reflectance of the asphalt coating, a fine powder of a pearlescent pigment (TZ1004 available from Global Pigments, LLC, White Plain, N.Y.), was deposited on the molten surface of asphalt coating by dusting the pigment through a U.S. #40 mesh filter. The resultant panel with pearlescent-pigmented surface had a very desirable black color, comparable to original asphalt coating, and a high solar reflectance of 39.5%.

EXAMPLE 2

An asphalt coating sample was first prepared by mixing 226.3 gm of roofing-grade asphalt with 420.3 gm of limestone filler (Global Stone, from James River, Inc., Buchanan, Va.) at 400° F. (204 degrees Centigrade) to a uniform mixture. The hot, molten asphalt coating was then gently poured onto a 4"×12×0.025" (10.16 cm×30.48 cm×0.0635 cm) aluminum panel to form a sheet about ⅛" (0.3175 cm) thick. Upon cooling to a surface temperature of around 350° F. (177 degrees Centigrade), roofing granules having #68 buff color (available from CertainTeed Corp., Norwood, Mass.) were evenly dropped onto the hot asphalt to completely covered the surface. The surface was then pressed by using a 27 lb (12.25 kg) roller back and forth to embed the granules into the coating. The excess granules were removed from the surface by inverting the panel followed by gentle tapping. One panel, designated as a control, was then set aside to cool. Another panel sample was immediately placed under an infrared heat lamp to keep the surface temperature at around 250° F. (121 degrees Centigrade) and then an infrared-functional pigment (9G1302 pearlescent pigment from Engelhard Corp., Iselin, N.J.) was evenly deposited through a #50-mesh filter onto the surface to cover the exposed asphalt coating between the roofing granules. The panel was then removed from the heat source to cool. After cooling, excess infrared-functional pigment was vacuumed from the surface for recycling.

The control sample panel had a regular shingle surface appearance with the solar reflectance of 23.4% (measured according to ASTM C1371 method) and HunterLab color reading of $L^*=52.68$, $a^*=6.67$, and $b^*=19.45$, whereas the sample panel with infrared-functional pigment had an increased solar reflectance of 25.3% and a similar color of $L^*=55.52$, $a^*=5.18$, and $b^*=16.09$.

EXAMPLE 3

Two shingle panel samples were prepared. An asphalt-coating sample was prepared by mixing 114.2 gm of roofing-grade asphalt from a Venezuelan crude with 212.1 gm of limestone filler at 400° F. (204 degrees Centigrade) to a uniform mixture. The hot, molten asphalt coating was then gently poured onto a 4"×12"×0.025" (10.16 cm×30.48 cm×0.0635 cm) aluminum panel to form a sheet about ⅛" (0.3175 cm) thick. One sample panel was then prepared as a control by applying #68 colored roofing granules (commercially available from CertainTeed Corp., Norwood, Mass.) at the surface temperature about 350° F. (177 degrees Centigrade) followed by pressing under a 27 lb (12.25 kg) roller as described in Example 2. For the second panel sample, a second coating containing infrared-reflective material, a white acrylic powder pigmented with $TiO_2$ as an infrared-reflective material (Ultra Detail, available from Mark Enterprises, Anaheim, Calif.), having a melting temperature of 300-325° F. (149-163 degrees Centigrade) was applied immediately after the pouring of the asphalt coating with while the surface temperature was greater than 375° F. (191 degrees Centigrade). Upon contacting the hot asphalt surface, the acrylic powder melted to form a continuous, uniform white reflective surface. While keeping the surface of the coated asphalt panel surface hot at 350° F. (177 degrees Centigrade) under a heat lamp, the same #68 colored roofing granules were applied onto the surface followed by pressing using a 27 lb (12.25 kg) roller to achieve a shingle surface appearance. Excess granules were removed from the surface by inverting the panel and tapping gently to shake them off. The sample panel was then allowed to cool in room temperature.

The resultant sample panel with the white acrylic coating between roofing granules had improved solar reflectance of 27.3% and a similar color reading of $L^*=55.27$, $a^*=5.58$, and $b^*=16.14$, as compared to the control panel of solar reflectance at 23.4% and color reading of $L^*=52.68$, $a^*=6.67$, $b^*=19.43$.

EXAMPLE 4

Another example of shingle surface with increased solar reflectance was prepared by first preparing an integrated sheet containing roofing granules and an acrylic binder followed by lamination onto a hot asphalt coating to form the product. The integrated sheet was prepared by applying a $TiO_2$ pigmented, exterior grade acrylic coating (ARM3640-1B available from Rohm & Haas Corp., Spring House, Pa.) at a thickness of 10 mil onto a silicone release paper using a stainless steel drawdown bar (part # SAR-5310 from BYK Gardner, Columbia, Md.). Roofing granules having a #68 buff color (available from CertainTeed Corp., Norwood, Mass.) were then applied onto the coating to completely cover the surface followed by pressing using a 27 lb (12.25 kg) roller. The sheet was then allowed to dry under ambient laboratory conditions to achieve the strength of the binder. The sheet was then removed from the release paper by rolling up as a pre-fabricated roll of integrated sheet. The integrated sheet was then laminated onto a hot asphalt coating containing 35% roofing-grade asphalt and 65% limestone filler by unrolling the integrated sheet. The lamination process was carried out at an asphalt surface temperature of 250-280° F. (121-138 degrees Centigrade) to avoid heat degradation of the acrylic binder. The resultant shingle had a solar reflectance of 25.0% and color reading of $L^*=54.55$, $a^*=6.37$, and $b^*=19.37$, as compared to a control with the same colored granules in asphalt coating (see Example 2) having solar reflectance of 23.4% and color reading of $L^*=52.68$, $a^*=6.67$, $b^*=19.43$.

EXAMPLE 5

An exterior grade coating suitable for spraying by a spray gun was prepared by mixing 50 g of acrylic coating (Rhoplex E1-2000, Rohm and Haas, Springfield, Pa.) and 6.4 g of light-interference platelet pigments of TZ4002 (Global Pigments, LLC, White Plains, N.Y.). The coating was then sprayed at air pressure of 67 psi onto the surface of a commercially available asphalt shingles (XT25 Star White, CertainTeed, Oxford, N.C.) to form a uniform coating. The resultant shingle had a desirable copper gold finish with L*=44.70, a*=20.37, b*=18.29, and a high solar reflectance of 25.3%, as measured by the ASTM C1549 method. A comparison of the CIE color parameters and solar reflectance of this shingle with a commercial asphalt shingle with similar colors, a conventional white asphalt shingle, and a white-asphalt shingle coated with a spray-on acrylic coating is provided in Table A below. These results show that the shingle of the present invention has deep-tone color properties similar to that of the commercial deep-tone shingle, but substantially improved solar reflectance.

TABLE A

| Sample Information | CIE Color Parameters | | | Solar Reflectance, % |
| --- | --- | --- | --- | --- |
| | L* | a* | b* | |
| White asphalt shingle | 62.91 | −0.55 | 3.73 | 28.7 |
| White asphalt shingle with a spray-on, clear acrylic coating | 61.9 | −0.63 | 2.82 | 28.2 |
| Example 5 (White asphalt shingle with a spray-on, pigmented acrylic coating) | 44.70 | 20.37 | 18.29 | 25.3 |
| Commercial asphalt shingle with comparable colors to Example 5 | 48.00 | 6.93 | 19.05 | 18.9 |

EXAMPLE 6

An asphalt shingle panel was prepared by first pouring an approximately ⅛" thick asphalt coating comprising a mixture of 35% of roofing grade asphalt and 65% by weight of calcium carbonate filler onto an aluminum panel. The coating panel was heated using a hot stage heater so that the asphalt remained molten, and an excess of mineral granules comprising of 80/% refractory grog having particle size between #8 and #20 mesh (Heavy Duty 8/20 from Maryland Refractories Co., Irondale, Ohio) and 20% of dark brown #41 granules (commercially available from CertainTeed Corp., Norwood, Mass.) was deposited on the onto the surface of molten asphalt. The granules were then pressed by using a 27 lb (12.25 kg) roller to result in a smooth surface. The resultant shingle panel had a "wood blend" appearance with color reading of L*=56.52, a*=3.78, b*=13.61 as measured by HunterLab calorimeter, and a solar reflectance of 35% as measured by using a portable solar reflectometer (Model SSR-E from Devices & Services, Dallas, Tex.).

Various modifications can be made in the details of the various embodiments of the processes, compositions and articles of the present invention, all within the scope and spirit of the invention and defined by the appended claims.

We claim:

1. An infrared-reflective roofing product comprising:
   (a) a fibrous web coated with a bituminous coating forming a bitumen-coated web,
   (b) a coating of at least one powder of an infrared-reflective material applied to the bitumen-coated web, and
   (c) roofing granules adhering to the bitumen-coated web.

2. An infrared-reflective roofing product according to claim 1 wherein the roofing granules comprise infrared-reflective roofing granules.

3. An infrared-reflective roofing product according to claim 1 wherein the at least one powder is selected from the group consisting of titanium dioxide pigments, nickel titanate pigments, chrome titanate pigments, nano-$TiO_2$ particles, light-interference platelet pigments, pearlescent pigments, metal-oxide coated substrate pigments, iron oxide yellow pigments, iron titanium oxides, metal flakes, silica encapsulated metal flakes, light-scattering pigments, and mirrorized fillers.

4. An infrared-reflective roofing product according to claim 1 having an L* value of less than 60 and a solar heat reflectance of greater than 25 percent.

5. An infrared-reflective product comprising:
   (a) a fibrous web coated with a bituminous coating forming a bitumen-coated web,
   (b) a coating material including a carrier and at least one powder of an infrared-reflective material applied to the bitumen-coated web, and
   (c) roofing granules adhering to the bitumen-coated web.

6. An infrared-reflective roofing-product according to claim 5 wherein the roofing granules comprise infrared-reflective roofing granules.

7. An infrared-reflective roofing product according to claim 5 wherein the at least one powder is selected from the group consisting of titanium dioxide pigments, nickel titanate pigments, chrome titanate pigments, nano-$TiO_2$ particles, light-interference platelet pigments, pearlescent pigments, metal-oxide coated substrate pigments, iron oxide yellow pigments, iron titanium oxides, metal flakes, silica encapsulated metal flakes, light-scattering pigments, and mirrorized fillers.

8. An infrared-reflective roofing product according to claim 5 having an L* value of less than 55 and a solar heat reflectance of greater than 25 percent.

9. An infrared-reflective roofing product comprising:
   (a) a fibrous web coated with a bituminous coating forming a bitumen-coated web,
   (b) a coating film including a film carrier and at least one powder of an infrared-reflective material applied to the bitumen-coated web, and
   (c) roofing granules adhering to the bitumen-coated web.

10. An infrared-reflective roofing product according to claim 9 wherein the roofing granules comprise infrared-reflective roofing granules.

11. An infrared-reflective roofing product according to claim 9 wherein the at least one powder is selected from the group consisting of titanium dioxide pigments, nickel titanate pigments, chrome titanate pigments, nano-$TiO_2$ particles, light-interference platelet pigments, pearlescent pigments, metal-oxide coated substrate pigments, iron oxide yellow pigments, iron titanium oxides, metal flakes, silica encapsulated metal flakes, light-scattering pigments, and mirrorized fillers.

12. An infrared-reflective roofing product according to claim 9 having an L* value of less than 60 and a solar heat reflectance of greater than 25 percent.

13. An infrared-reflective product comprising:
   (a) a fibrous web coated with a bituminous coating forming a bitumen-coated web,
   (b) a coating web including a web carrier, at least one powder of an infrared-reflective material and roofing granules, the coating web adhering to the bitumen-coated web.

14. An infrared-reflective roofing product according to claim 13 wherein the roofing granules comprise infrared-reflective roofing granules.

15. An infrared-reflective roofing product according to claim 13 wherein the at least one powder is selected from the group consisting of titanium dioxide pigments, nickel titanate pigments, chrome titanate pigments, nano-$TiO_2$ particles, light-interference platelet pigments, pearlescent pigments, metal-oxide coated substrate pigments, iron oxide yellow pigments, iron titanium oxides, metal flakes, silica encapsulated metal flakes, light-scattering pigments, and mirrorized fillers.

16. An infrared-reflective roofing product according to claim 13 having an L* value of less than 60 and a solar heat reflectance of greater than 25 percent.

17. An infrared-reflective roofing product comprising:
(a) a fibrous web coated with a bituminous coating forming a bitumen-coated web,
(b) roofing granules applied to the bitumen-coated web to form an intermediate product, and
(c) a coating film including a film carrier and at least one powder of an infrared-reflective material adhering to the intermediate product.

18. An infrared-reflective roofing product according to claim 17 wherein the roofing granules comprise infrared-reflective roofing granules.

19. An infrared-reflective roofing product according to claim 17 wherein the at least one powder is selected from the group consisting of titanium dioxide pigments, nickel titanate pigments, chrome titanate pigments, nano-$TiO_2$ particles, light-interference platelet pigments, pearlescent pigments, metal-oxide coated substrate pigments, iron oxide yellow pigments, iron titanium oxides, metal flakes, silica encapsulated metal flakes, light-scattering pigments, and mirrorized fillers.

20. An infrared-reflective roofing product according to claim 17 having an L* value of less than 60 and a solar heat reflectance of greater than 25 percent.

* * * * *

UNITED STATES PATENT AND TRADEMARK OFFICE
CERTIFICATE OF CORRECTION

PATENT NO.       : 7,452,598 B2  
APPLICATION NO.  : 10/749680  
DATED            : November 18, 2008  
INVENTOR(S)      : Ming L. Shiao et al.

It is certified that error appears in the above-identified patent and that said Letters Patent is hereby corrected as shown below:

Col. 15, line 3 "606" should be --600--

Col. 22, line 4 after An infrared-reflective please insert --deep-tone-- before roofing product according to Signed and Sealed this Seventeenth Day of February, 2009

JOHN DOLL  
*Acting Director of the United States Patent and Trademark Office*